United States Patent
Tikoian et al.

(10) Patent No.: US 11,895,071 B1
(45) Date of Patent: Feb. 6, 2024

(54) FILTERING NOTIFICATIONS AND MESSAGES

(71) Applicant: Capital One Services, LLC, McLean, VA (US)

(72) Inventors: Kathryn Tikoian, South Orange, NJ (US); Joshua Edwards, Philadelphia, PA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/868,149

(22) Filed: Jul. 19, 2022

(51) Int. Cl.
*H04L 51/212* (2022.01)
*H04L 51/222* (2022.01)
*G06N 20/00* (2019.01)
*H04L 67/50* (2022.01)
*H04L 67/306* (2022.01)
*H04L 51/234* (2022.01)
*H04L 51/224* (2022.01)

(52) U.S. Cl.
CPC ........... *H04L 51/212* (2022.05); *G06N 20/00* (2019.01); *H04L 51/222* (2022.05); *H04L 51/224* (2022.05); *H04L 51/234* (2022.05); *H04L 67/306* (2013.01); *H04L 67/535* (2022.05)

(58) Field of Classification Search
CPC ..... G06N 20/00; H04L 67/535; H04L 67/306; H04L 51/234; H04L 51/224; H04L 51/212; H04L 51/214; H04L 51/222; H04L 51/216; H04L 51/226
See application file for complete search history.

(56) References Cited

U.S. PATENT DOCUMENTS 9,986,376 B1    5/2018  Anima
10,200,237 B1 * 2/2019  Gupta ................... H04L 67/306
(Continued)

FOREIGN PATENT DOCUMENTS

WO    WO-2011067675 A2 *  6/2011  ............. G06Q 30/02
WO    WO-2015184359 A2 * 12/2015  ........... G06Q 10/107

OTHER PUBLICATIONS

Fulvio Corno, Luigi De Russis, Teodoro Montanaro, "A Context and User Aware Smart Notification System" 978-1-5090-0366-2/15/ $31.00 © 2015 IEEE, pp. 1-6 (Year: 2015).*

(Continued)

*Primary Examiner* — Glenton B Burgess
*Assistant Examiner* — Rachel J Hackenberg
(74) *Attorney, Agent, or Firm* — Perkins Coie LLP

(57) ABSTRACT

Disclosed embodiments pertain to filtering application notifications from one or more applications on an electronic device. A request can be received from an application installed on the electronic device to present a notification. In response, a machine learning model is invoked that is trained to generate a relevancy score for a notification based on historical behavior of the user with respect to previous notifications from the application as well as the active context of the user. The relevancy score can be compared with a threshold to determine whether the threshold is satisfied. Notification filtering can be performed based on whether or not the threshold is satisfied. The method can filter out the notification from presentation if the threshold is satisfied and present the notification if the threshold is unsatisfied, or vice versa.

20 Claims, 9 Drawing Sheets

(56) References Cited

U.S. PATENT DOCUMENTS

| | | | |
|---|---|---|---|
| 10,686,740 B2* | 6/2020 | Alfaro | H04L 51/212 |
| 10,924,445 B2 | 2/2021 | Ratiu et al. | |
| 11,038,825 B2* | 6/2021 | Le Strat | H04L 51/046 |
| 2011/0029598 A1 | 2/2011 | Arnold et al. | |
| 2016/0165040 A1 | 6/2016 | Quera | |
| 2017/0185650 A1* | 6/2017 | Vainas | G06F 16/24575 |
| 2017/0316320 A1* | 11/2017 | Jamjoom | G06Q 10/109 |
| 2018/0046929 A1* | 2/2018 | Xuan | G06Q 10/00 |
| 2018/0219817 A1 | 8/2018 | Zang et al. | |
| 2019/0045020 A1* | 2/2019 | Ein-Gil | A61B 5/165 |
| 2019/0173826 A1 | 6/2019 | Deluca et al. | |
| 2020/0026776 A1 | 1/2020 | Boss | |
| 2021/0067598 A1* | 3/2021 | Bhat | H04L 67/63 |
| 2021/0134434 A1 | 5/2021 | Riley et al. | |
| 2021/0342740 A1 | 11/2021 | Xu et al. | |
| 2021/0389999 A1* | 12/2021 | Malireddi | G06Q 10/10 |

OTHER PUBLICATIONS

Tianshi Li "Alert Now or Never: Understanding and Predicting Notification Preferences of Smartphone Users" published, ACM Transactions on Computer-Human Interaction, vol. 29, No. 5, Article 39. Publication date: Nov. 2022, pp. 1-33. (Year: 2022).*

* cited by examiner

FILTERING NOTIFICATIONS AND MESSAGES

BACKGROUND

Computing devices present notifications to users for various purposes, such as providing information, announcing events, warning about impending situations, and so forth. At least some of these notifications may be generated initially by a corresponding application to deliver information managed by the application. As the computing power of user devices such as mobile phones has increased, phones are now capable of running several applications simultaneously with each application potentially generating notifications for the phone user. For example, an email application of a mobile device can generate a pop-up message for display on an interface of the mobile device when a new email is received (e.g., on the lock screen or home screen). In some instances, other applications may generate badge notifications and push notifications. Notifications are generated for other sources capable of providing information to or that support the functionality of the computing device. For instance, notifications may be generated for short message service (SMS) messages, phone calls, voicemails, and social-networking service events.

Due to the increasing number of these sources and applications, the number of notifications handled by computing devices has also increased. The number of notifications has increased so greatly that it is impractical for most users to act on each of the notifications. Thus, device users are inundated with notifications from various applications on their phones and computers. They may develop blindness to notifications and find it difficult to find the signal through the noise. Consequently, users can miss desired information. Users desire to find meaning in their notifications again and not constantly stockpile unread notifications and badge application icons the device user has become blind to and ignores.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

According to one aspect, disclosed embodiments may include a system that comprises a processor coupled to a memory that includes operating system instructions that, when executed by the processor, cause the processor to determine an active context of a user in response to a request from an application to present a notification, and invoke a machine learning model with the notification and the active context, in which the machine learning model is trained to generate a relevancy score for the notification based on historical behavior of the user with respect to previous notifications from the application and the active context of the user. Further, the instructions may cause the processor to compare the relevancy score to a predetermined threshold and filter out the notification when the relevancy score satisfies the predetermined threshold, otherwise presenting the notification to the user. The instructions may further cause the processor to present a filtered-out notification at a later time. In one instance, the later time may be determined based on the active context. Further, the instructions may cause the processor to invoke a second machine learning model trained to predict an optimal time based on the active user context. The instructions may also cause the processor to record a presented notification, an interaction with the presented notification and the active context, and update the machine learning model with recorded information. In addition, the instructions may cause the processor to determine that the notification is a service notification and present the service notification regardless of the relevancy score. In another scenario, the instructions may cause the processor to determine that the notification is time sensitive with an expiration date and present the notification before the expiration date. Furthermore, the instructions may cause the processor to determine the active context of the user based on at least one of calendar and location data.

In accordance with another aspect, disclosed embodiments may include a method comprising executing, on an electronic device processor, instructions that cause the processor to perform operations for displaying notifications of interest to a user. The operations may include determining an active context of a user in response to a request from an application to present a notification, invoking a machine learning model with the notification and the active context, wherein the machine learning model is trained to generate a relevancy score for the notification based on historical behavior of the user with respect to previous notifications from the application and the active context of the user, comparing the relevancy score to a predetermined threshold, and filtering out the notification when the relevancy score satisfies the predetermined threshold, otherwise presenting the notification to the user. The operations may further comprise presenting a filtered-out notification at a later time and determining the later time based on the active user context. Further, the operations may comprise invoking a second machine learning model trained to predict an optimal time based on the active user context. The operations may also comprise recording a presented notification, interaction with the presented notification and the active context, and updating the machine learning model with recorded information. Further, the method may comprise determining that the notification is a service notification and presenting the service notification regardless of the relevancy score. Furthermore, the operations may comprise determining that the notification is time sensitive with an expiration date and presenting the notification before the expiration date.

According to yet another aspect, disclosed embodiments may include a computer-implemented method. The method comprises receiving a notification from one or more applications installed on an electronic device, executing a machine learning model that generates a relevancy score for a notification based on historical behavior of a user with respect to previous notifications from the one or more applications, comparing the relevancy score to a predetermined threshold to create a comparison result, and presenting the notification when the comparison result indicates that the relevancy score satisfies the predetermined threshold for presentation. The method may further comprise delaying the presentation of the notification based on the comparison result. Further, the computer-implemented method may comprise analyzing an electronic calendar, time of day, and user location to create an analysis result that establishes an active context of the user and delaying the presentation of the notification based on the active context of the user. The method may also comprise determining the active context of the user and executing the machine learning model trained based on the historical behavior of the user and the active context of the user that generates the relevancy score. Furthermore, the method may comprise recording interaction with a presented notification and updating the machine learning model with the interaction.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

The accompanying drawings, which are incorporated in and constitute a part of the specification, illustrate various example methods and other example embodiments of various aspects of the claimed subject disclosure. It will be appreciated that the illustrated element boundaries (e.g., boxes, groups of boxes, or other shapes) in the figures represent one example of the boundaries. It is appreciated that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
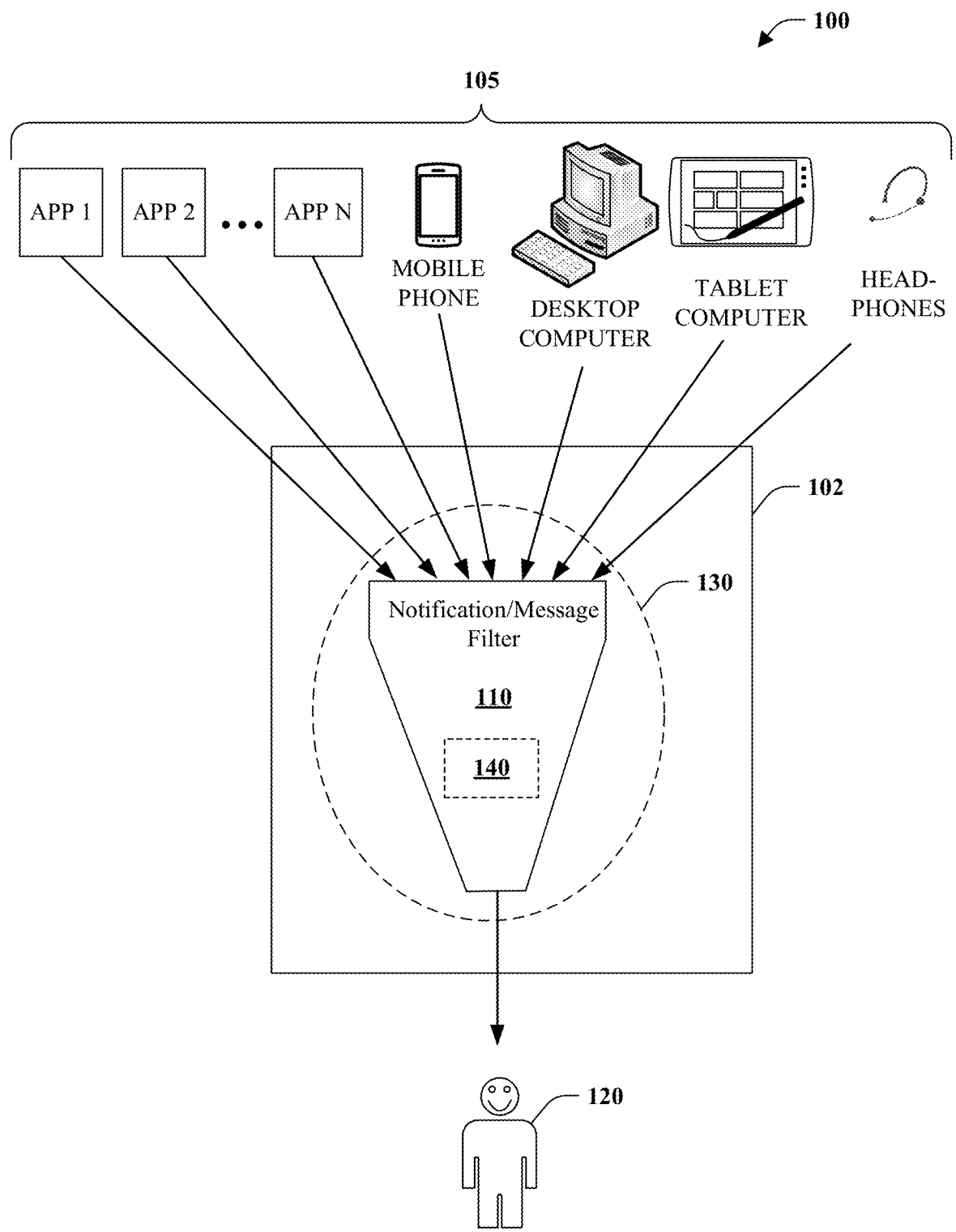
FIG. 1 illustrates an overview of an example implementation.

Research and personal use indicate that people are inundated with notifications and messaging on their phones or mobile devices. In general, each application (app) running on a phone may indicate that their notification or message is of a higher priority than notifications and messages of other applications running on the device. However, to the user, not every notification, whether a badge on an app, banner, or lock-screen alert, is a really high priority. When nearly every notification or message is given a high priority, users may ignore or delete many notifications without fully considering their information. Consequently, users can miss desired information.

To more effectively present notifications and messages to a user, a system proactively learns from a user's behavior and environment what notifications and messages are important to the user without or with limited assistance. The system may use various techniques for learned user preference and behavior-based notification filtering. In one or more implementations, notifications obtained from different applications and services are filtered to present important notifications to a user based on the user's current context. Additionally, a subset of the notifications obtained is determined "important" based on learned user preferences and behaviors regarding notifications in different contexts. User preferences may be learned, for instance, by monitoring a user's actions when they are presented with a type of notification, for example, by tracking whether the user opens a notification, hides the notification, deletes the notification, and so forth. User behaviors may be learned by continually monitoring a user's actions performed relative to events for which notifications can be generated.

For instance, the system may learn that a user checks work email at certain times (e.g., 9:00 AM to 5:00 PM) but not at other times. From this, the techniques can infer that the user may wish to be notified about work emails (e.g., with pop-ups or some other notification mechanism) at those certain times of the day but not at other times. Several other examples of how a system may learn what notifications and messages are important to a user are described below.

By limiting the notifications presented to those that are important to users in a given context, users may be inclined to fully consider and act on a greater number of presented notifications compared to conventional techniques. Proactively filtering notifications and messages makes users less annoyed with the presented notifications. Further, user experiences with computing devices that employ the techniques described herein can be improved due to the improved interactions and reduced annoyance with notifications.

Details disclosed herein describe a way of proactively filtering notifications and messages that a user is interested in seeing. In an example instance, an app decides to send a notification and determines a notification level of the notification. The app sends the notification to an operating system (OS) requesting the notification be sent to the user. The OS may also send that notification to a machine learning (ML) model to determine the relevancy of that notification. This may depend on the type of application that sent the notification and how much a user cares about this notification. In one configuration, the ML model compares an importance score from historical usage combined with the importance the app has assigned for the notification to determine if that notification should be shown to the user immediately. If those scores are high enough, the OS has the notification shown to the user immediately. If not, the OS determines if the notification should be snoozed/delayed, and then shows those notifications after a desired snooze time. If the relevance of the message expires, the OS drops the message and never displays or has the notification displayed. Alternatively, the OS may determine the notification is a service notification and that the service notification may be immediately displayed, as discussed above. An example of a service notification is a notification that a bill must be paid within a few hours or a specific service will be canceled. This type of message is of significant interest to the user and should be shown immediately.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

"Processor" and "Logic", as used herein, includes but are not limited to hardware, firmware, software, and/or combinations of each to perform a function(s) or an action(s), and/or to cause a function or action from another logic, method, and/or system to be performed. For example, based on a desired application or need, the logic and/or the processor may include a software-controlled microprocessor, discrete logic, an application specific integrated circuit (ASIC), a programmed logic device, a memory device containing instructions, or the like. The logic and/or the processor may include one or more physical gates, combinations of gates, or other circuit components. The logic and/or the processor may also be fully embodied as software. Where multiple logics and/or processors are described, it may be possible to incorporate the multiple logics and/or processors into one physical logic (or processor). Similarly, where a single logic and/or processor is described, it may be possible to distribute that single logic and/or processor between multiple physical logics and/or processors.

"Notification" and "Message", as used herein, may be used together, but "notification" may be used without the term "message". However, it is to be understood that when "notification" is used without the term "message", that it is understood that the term "notification" also includes "message" even though the term "message" has not been explicitly included with the term "notification". Additionally, the term "message" is understood to include indications that include at least two textual terms combined together to form a textual message or the like. The term "notification" includes at least test messages, audio messages, vibratory messages, light signal messages, and the like. These indications may be separate or combined with other indications.

As previously mentioned, currently, device users are inundated with notifications from various applications on their phones and computers. Device users often have developed a blindness to badge icons and push notifications and find it difficult to find the signal through the noise. To alleviate this situation, systems and methods may use an operating system (OS) in combination with applications running on a device so that the OS may filter what messages from the application reach a user of the device.

Referring initially to FIG. 1, a high-level overview of an example implementation of a system 100 for filtering notifications and messages from a variety of notifications and message sources 105 is illustrated with the notification and message sources 105 associated with an electronic device 102. The example notification and message sources include an application 1 (app1), an app2, through an application N (appN), a mobile phone, a desktop computer, a tablet computer, a headset, or other devices. These notification and message sources 105 generate many notifications and messages that are input to a notification/message filter 110 that filters out notifications and messages that a user 120 is likely not interested in receiving.

The notification/message filter 110 allows notifications and messages that the user is interested in viewing or responding to, to reach the user 120. This example implementation includes a variety of sources that generate notifications and messages. For example, application 1 (app1), app2, through application N (appN) may generate notifications and messages. Each application (app1, app2, through appN) may indicate that its messages are of high importance as each application is not aware of what other applications are running on a phone. Any specific application cannot accurately rank the importance of its notifications and messages with respect to other applications and devices because it does not have any awareness of the presence of the other applications and devices.

In order to keep track of multiple apps sending notifications and messages, each app may be required to first send its notifications and messages to an OS 130 (operating system) running on the user's phone or other electronic device. The OS 130 will be aware of each app that is sending notifications and messages to the OS 130 as well as other devices that are sending notifications and messages to the OS 130. In some scenarios, machine learning (ML) may be used to give the notification/message filter 110 a sense of history as to what notifications and messages the user has reacted to in the past, which may indicate what notifications and messages are important to the user. An ML model 140 may be updated with results of what the user has currently reacted to with respect to notifications and messages. The ML model 140 may even be used to predict what notifications and messages the user may be interested in that originated from other devices (desktop computer, tablet computer, headset, etc.) that are not apps under control of the OS 130.

Notifications and messages that the user has interacted with may be used by the ML model 140 to determine which notifications and messages are important in different contexts-notifications of a type the user has interacted with positively (e.g., selected, opened, and read) in previously encountered contexts, notifications for types of interactions the user has demonstrated interest in the previously encountered contexts, and so forth. Thus, given the current context, determinations are made as to whether notifications are important. Based on these determinations, the important notifications and messages may then be presented.

Figure 2:
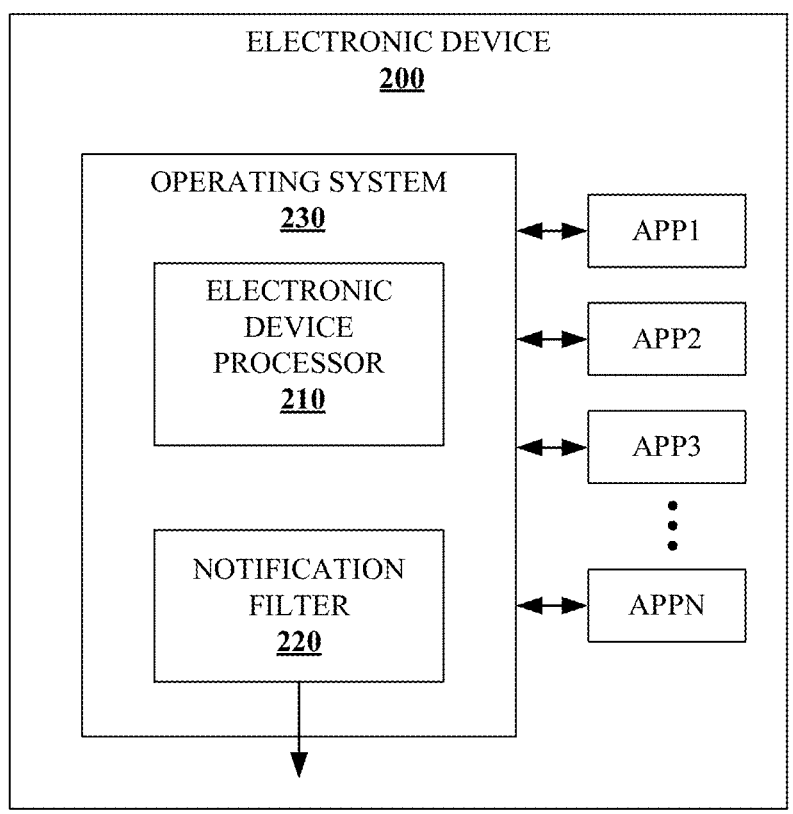
FIG. 2 is a block diagram of a notification filter system.

Turning attention to FIG. 2, an electronic device 200 for filtering multiple notifications and messages is illustrated in further detail. The electronic device 200 includes an electronic device processor 210, a notification filter 220, an OS 230 (operating system), as well as a first application (app1), a second app2 through app N. Apps 1-N are interfacing with the OS. In some instances, the electronic device 200 may be a user device, mobile phone, a tablet device, a desktop device such as a computer, a client device, or another type of electronic device.

The notification filter 220 has the capability of filtering and providing a way to limit the number of notifications and messages down to those notifications and messages that the user is interested in. The notification filter 220 may do this in a variety of ways, as discussed below. The notification filter 220 may operate in conjunction with the OS 230 and, in some configurations, may be fully integrated as part of the OS 230. Alternatively, or in addition, the notification filter 220 may be software that may run as part of the system, or the notification filter 220 may be a separate logic that may run within a processor. In some instances, the notification filter 220 may be implemented in silicon or another material or hardware.

The OS 230 is an operating system that is common on most electronic devices that coordinates the use of electronic device resources among several applications, peripheral devices, and other devices running on an electronic device. As understood by those of ordinary skill in the art, the OS 230 may be a single task or multitask OS, may be a single user or multiuser OS, may be a distributed OS, may be an embedded OS, a real-time OS, or another suitable OS as understood by those of ordinary skill in the art.

The electronic device processor 210 may be implemented with solid state devices such as transistors to create a processor that implements functions that one of ordinary skill in the art will appreciate is executed in silicon or other materials. Furthermore, the electronic device processor 210 may be implemented with a general-purpose processor, a digital signal processor (DSP), an application-specific integrated circuit (ASIC), a field-programmable gate array (FPGA), or another programmable logic device, discrete gates or transistor logics, discrete hardware components, or any combination thereof designed to perform the functions described herein. A general-purpose processor may be a microprocessor, but in the alternative, the processor may be any processor, controller, microcontroller, or state machine. The electronic device processor 210 may also be implemented as a combination of computing devices, for example, a combination of a DSP and a microprocessor, a plurality of microprocessors, multi-core processors, one or more microprocessors in conjunction with a DSP core, or any other such configuration. In some instances, the processor(s) may be a graphics processor unit (GPU) that performs calculations concerning digital image processing and computer graphics.

The electronic device 200 with the notification filter 220 provides a way for device users to find meaning in their notifications again and not constantly have unread notifications the device user ignores such that the user is blind to notifications and badge application icons that are received from apps 1-N.

In some instances, how the electronic device 200 filters notifications may also be called "Inbox Zero Mode". Several examples are now presented on how the OS 230 and notification filter 220 can interact together, as discussed below, when determining which notifications and messages will reach the user of the electronic device 200. As previously mentioned, the notification filter 220 may be part of the OS 230. In one example operation, each app 1-N weights their notifications and gives a higher weight to more important notifications. The OS 230 may also weight the application notification or message based on usage and device user interaction with notifications. For example, if the user of the electronic device 200 is clicking on a first application's notifications and never, or rarely, clicks on a second application's notifications, then the OS 230 and notification filter 220 recognize the notifications or messages from the first application are determined to be of greater importance to the user. In that case, only nonfictions or messages from the first application may be presented to the user, and notifications and messages from the second application will be blocked by the OS 230 and the notification filter 220.

In some cases, the notifications with high weights from both the application and the OS 230 are important enough to be seen by the device user. These notifications and/or messages make it to the home/lock screen and/or trigger a badge application icon or trigger another type of device user alert. Similarly, alerts may be accessed and prioritized by clicking into an application through the device's user interface. Similar to email priority ranking, an app 1-N may allow a user to prioritize which type of notifications are permitted within an app 1-N. As discussed below, a prediction algorithm in the OS 230, or the notification filter 220, may additionally be used to determine how likely a notification is important enough to be reported back to the device user.

If the apps 1-N are given permission to set priorities for notifications, the apps 1-N may always set their own notifications as a high priority. However, in some instances, the individual apps 1-N are not the final authority because each individual app 1-N may always set its own notification as a higher priority than the other app 1-N notifications. If one of the apps 1-N sets all notifications at a high priority, then a downside can be that if that app is downgraded to a lower priority, then all the notifications will together also be downgraded to a lower priority at the same time.

In yet another example situation, one of the apps 1-N may set a notification priority level appropriate by indicating higher priority notification(s), next higher priority notification(s), down to the lower priority notifications and messages. Obviously, the priority should be high enough to send a notification, but the priority should not be as high as other notifications. In this situation, the user may engage with all or almost all of their notifications from this app and continue receiving notifications from this app. However, users that ignore all notifications from that app will not continue to receive notifications from that app. For example, Grubhub sends coupon notifications when food has been ordered is a useful notification. By contrast, pushing the Gruhub coupon code a week later when not ordering food is a less useful notification.

The OS 230 and/or notification filter 220 may also filter notifications based on whether the notifications are service notifications or not. For example, knowing that a notification is a service level notification is critical and that other notifications are less critical or at lower levels of importance allows better prioritization of notifications. Apps 1-N could configure service level notifications as critical notifications to override OS 230 functionality. This functionality may, in one example, be similar to "do not call lists". Do not call lists will not call a user's phone number for advertising, marketing, and the like. However, in some instances, a do not call list may be overridden for service level notifications. For example, a call to notify a customer that a person will be arriving at the customer's house to work on a box associated with their phone service may still reach the customer through their phone. In another instance, there may be a limited number of overrides over the do not call list, as a limited number of service level messages per month, week, or another time frame, or frames may be allowed. This allows phone users to receive messages that they most care about and that they want within a time frame that the service notifications are useful. For example, a notification may inform a customer they need to pay their bill in the next two hours, or the customer will have their service canceled. It would be useless to receive that notification after two hours.

Another factor that the OS 230 and/or notification filter 220 may filter notifications and messages on is to have the OS 230 and/or notification filter 220 recognize a smarter do not disturb mode. This can include realizing that a user does not use certain notifications during a curtain time window(s) and not even sending notifications during that time window(s) but might allow those notifications to be sent during a later time window. For example, if it is a time-sensitive notification, it may simply go away as it is of no use during a later time, but if it is not time-sensitive, the notification may be sent at a later time when the user is more likely to use the notification. For example, a Pokémon alert that there is a nearby Pokémon may be time sensitive and may go away in about five minutes because the user is at work and the current Pokémon alert will not be resent at a later time. A different alert, such as a friend request notification, that is not time-sensitive, may allow the OS 230 to hold onto the notification and not push the notification. The OS 230 may send the notification at a later time in the day, such as 6 PM or 7 PM, or at a different time window when the notification may still be valid, and a user is more likely to react to the notification. In other situations, the OS 230 may notify the app that the notification should be resent by the app at a later or different time.

The OS 230 and/or notification filter 220 may also filter notifications and messages based on user preferences with category types where, for example, a news alert is not as important as a Pokémon Go notification. Building context into the OS 230 and/or notification filter 220, may provide for the OS 230 and/or notification filter 220 to link to a calendar and recognize activities such as a workout so that the OS 230 and/or notification filter 220 may also factor into delivery timing that the OS 230 and/or notification filter 220 may release a notification. In other instances, the electronic device 200 may (1) create a visual notification, a haptic notification, and/or a vibratory notification, and (2) a periodic reminder, all of which may be generated according to user preferences. The OS 230 and/or notification filter 220 may alter other types of notifications based on preference factors, such as vibratory, audio, blinking, turning on a flash on the back of the phone, and so on. For example, thunderstorm warning notifications may flash the screen and vibrate the user device when they are deemed to have high importance to the user.

Figure 3:
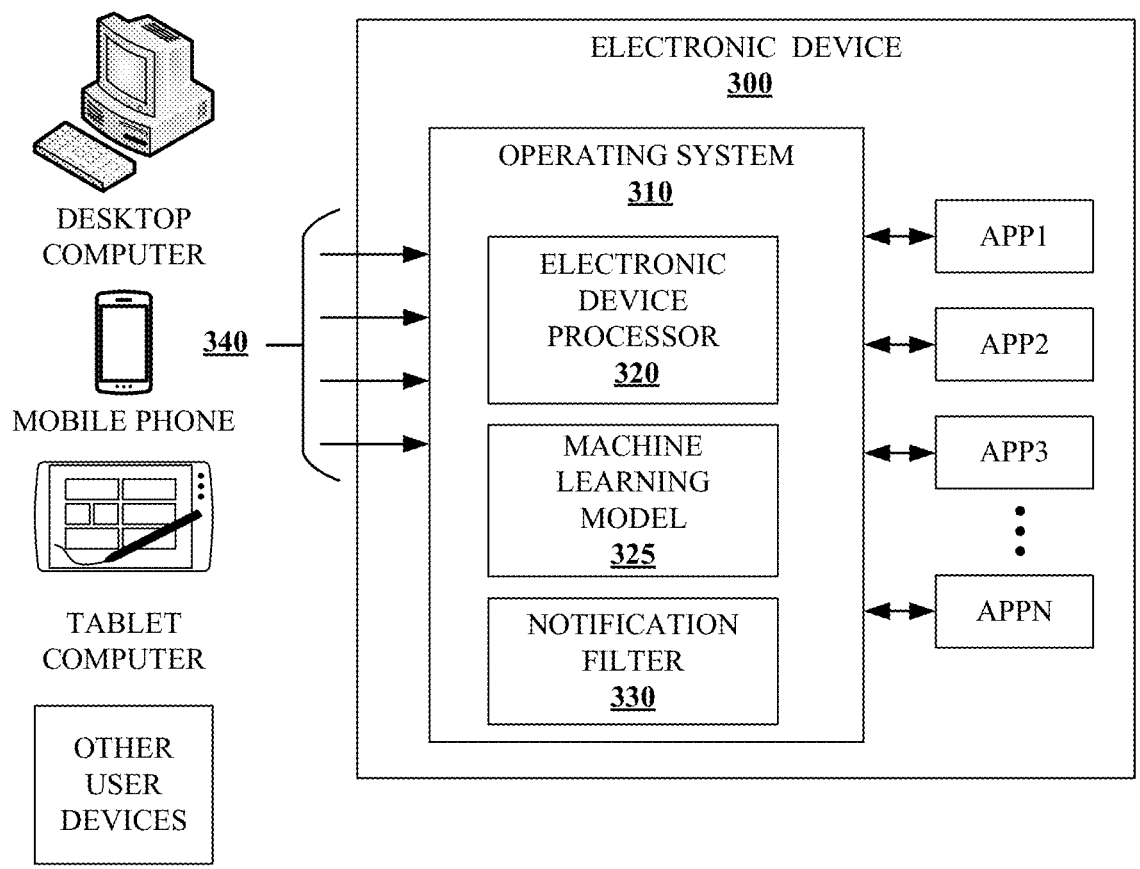
FIG. 3 is a block diagram of another notification filter system.

FIG. 3 illustrates another example electronic device (e.g., electronic device 300) for filtering notifications and messages. The electronic device 300 includes an OS 310 (operating system), an electronic device processor 320, and apps 1-N. In accordance with another aspect, the electronic device 300 includes inputs 340 from a variety of other devices. For example, the other devices may include a desktop computer, a mobile phone, a tablet computer, and/or other devices. The electronic device 300 filters notifications and messages using the OS 310 and/or notification filter 330 and an ML model 325 (machine learning model) that is updated and trained.

FIG. 3 includes much of the functionality of FIG. 2 and filters the inputs 340 from a desktop computer, a mobile phone, a tablet computer, and/or other devices are input to the OS 310 in addition to filtering notifications from apps 1-N. The notification filter 330, as well as the ML model 325 filter, determine which of several notifications and messages reach a user of the electronic device 300 based, at least in part, on the filtering/learning of the ML model 325 as well as the notification filter 330. Details indicating how the ML model 325 and the OS 310 and/or notification filter 330 are able to filter notifications and messages and generally only display notifications and messages of interest to a user are described below.

The OS 310 and/or notification filter 330 and ML model 325 have the capability of filtering and providing a way to limit the number of notifications and messages down to those notifications and messages that the user is interested in. The notification filter may do this in a variety of ways, as discussed below. The OS 310 may be an operating system that is common on most electronic devices that coordinates the use of electronic device resources among several applications, peripheral devices, and other devices running on an electronic device. As understood by those of ordinary skill in the art, the OS 310 may be a single task or multitask OS, may be a single user or multiuser OS, may be a distributed OS, may be an embedded OS, a real-time OS, or another suitable OS as understood by those of ordinary skill in the art.

The electronic device processor 320 may be implemented with solid state devices such as transistors and may be a processor that implements functions that one of ordinary skill in the art would understand.

The electronic device 300 with the notification filter 330 provides a way for device users to find meaning in their notifications again and not constantly have unread notifications and badge application icons the device user ignores. Several examples are now presented on how the OS 310 and/or notification filter 330 and ML model 325 may interact together when determining which notifications and messages will reach the user of the electronic device 300. In one example operation, each app 1-N weights their notifications and gives a higher weight to more important notifications. The OS 310 and/or notification filter 330 and ML model 325 weight the application notification or message based on usage and device user interaction with the notifications. For example, if the user of the electronic device 300 is clicking on a first application's notifications and never, or rarely, clicks on a second application's notifications, then notifications or messages from the first application are determined by the OS 310 and/or notification filter 330 and ML model 325 to be of greater importance to the user. In that case, only nonfictions or messages from the first application may be presented to the user, and notifications and messages from the second application will be blocked by the OS 310 and/or notification filter 330 and ML model 325. Only the notifications with high weights from the application and the OS 310 and/or notification filter 330 and ML model 325 are important enough to be seen by the device user. These notifications and/or messages make it to the home/lock screen and/or trigger a badge application icon or trigger another type of device user alert. Similarly, alerts may be accessed and prioritized by clicking into an application through the device's user interface. Similar to email priority ranking, an app 1-N may allow a user to prioritize which type of notifications are permitted within an app 1-N. As discussed below, a prediction algorithm in the OS 310, the notification filter 330, and/or ML model 325 may additionally be used to determine how likely a message is important enough to be reported back to the device user.

The ML model 325 uses machine learning to determine when a user of the electronic device 300 is interested in receiving a notification or message from among a group of many messages. Machine learning (ML) is the use of computer algorithms that can improve automatically through experience and by the use of data. It is seen as a part of artificial intelligence. Machine learning algorithms build a model based on sample data, known as training data, in order to make predictions or decisions without being explicitly programmed to do so. ML models are used in a wide variety of applications, such as in medicine, email filtering, speech recognition, and computer vision, where it is difficult or unfeasible to develop conventional algorithms to perform the needed tasks.

The filtering of the notification filter 330 and the ML model 325 are illustrated and described with reference to example situations and models. In a typical scenario, the electronic device 300 desires to put more emphasis on one alert/message rather than other alert/messages in a similar way Google does with emails. Artificial Intelligence (AI) and ML can understand the user's behavior to determine what is important to the user as to notifications and alerts and then weight future alerts and notifications on a level of priority. After this, the ML model 325 may push those alerts and notifications to a user in a way that is a higher-level priority.

Furthermore, a neural network model may form a portion of the ML model 325 that determines which notifications and/or messages a user of the electronic device is most interested in viewing or being interrupted with. A neural network is a simulated or built network or circuit of neurons, or an artificial neural network, composed of artificial neurons or nodes. Thus, a neural network (e.g., ML model 325) is either made up of an artificial neural network or a biological neural network (theoretically) for solving artificial intelligence (AI) problems. The connections of the neurons are modeled in artificial neural networks as weights between nodes. A positive weight reflects an excitatory connection, while negative values mean inhibitory connections. All inputs are modified by a weight and summed. This activity is referred to as a linear combination. Finally, an activation function controls the amplitude of the output. For example, an acceptable range of output is usually between 0 and 1, or it could be a binary value of 0 or 1. These artificial networks may be used for predictive modeling, adaptive control, and applications where they can be trained via a dataset. Self-learning resulting from experience can occur within networks, which can derive conclusions from a complex and seemingly unrelated set of information. For example, where determining which notification a user desires to receive.

Artificial intelligence, such as the ML model 325, is the simulation of human intelligence processes by machines, especially computer systems. Specific applications of AI include expert systems, natural language processing, and speech recognition and machine vision. AI sometimes requires a foundation of specialized hardware and software for writing and training machine learning algorithms. In general, AI systems work by ingesting large amounts of labeled training data, analyzing the data for correlations and patterns, and using these patterns to make predictions about future states. In this way, a chat-bot that is fed examples of text chats can learn to produce lifelike exchanges with people, or an image recognition tool can learn to identify and describe objects in images by reviewing millions of examples.

AI programming focuses on three cognitive skills: learning, reasoning, and self-correction. This learning process aspect of AI programming focuses on acquiring data and creating rules for how to turn the data into actionable information. The rules, which are called algorithms, provide computing devices with step-by-step instructions for how to complete a specific task. The specific task of interest for the artificial intelligence logic is to determine what notifications and messages may be of interest to the user based on a user's past history with messages and applications and other indicators.

As part of learning the preferences and behaviors, the techniques may thus consider several different characteristics of a context in which the user performs notification-relevant actions. By way of example, when a user performs notification-relevant actions, data may be captured that describes a current action or history of just-performed actions, notifications responded to by a user, past notifications responded to or rejected by a user, a location of the user, a calendar of the user, a payload of a notification under consideration, engagement of the user with instrumentation involved with engaging with notifications of a corresponding computing device, ranked preferences of notifications of the user, a communication history of the user, a current device of the user, and so forth. By capturing this information, the techniques learn the actions users perform relative to notifications and events for which notifications can be generated in different contexts.

In some embodiments, a user may affect the creation of an ML model 325 to determine which messages show up and which alerts and notifications should not show up on display(s) of the electronic device 300. The ML model 325 may want to look at a user's engagement with notifications and alerts. For example, even though Pokémon may not be critical because it is essentially a game, it may be deemed critical by a user if the user engages with Pokémon notifications. For example, the ML model 325 may use a few different factors in AI, such as how people in the aggregate interact with notifications when trying to figure out the importance, the aggregate, of users' interest in notifications from an app, such as Pokémon. However, the ML model 325 can also use data from individual interactions.

The ML model 325 may also include inputs of what notifications a user enabled when installing a new application. A user setting application notifications levels of importance, in itself, indicates that a user feels those messages are of some level of importance. However, later a user may realize or change their mind to feel that those notifications are less (or more) important. The ML model 325 may detect changing user behavior patterns with respect to notifications related to the original application notification settings and adjust what notifications are presented to the user.

The ML model 325 may collect other information when determining what notifications are important to a user of the electronic device 300. In another example, eBay may send a notification at 3 AM to sell an item cheaper, and a user may not care about those notifications and does not open the eBay app. However, eBay may send another notification saying something was sold. In this case, the user may not engage with the device at all for several hours, but when the user uses that app, they may open the app on their device for at least 5 to 10 minutes which would indicate that this message was very important to the user.

In other situations, a user may only interact with certain notifications during certain hours, such as lunchtime, or after work evening hours, or other hours or time ranges. Therefore, the ML model 325 can figure out what is of priority and what is not of priority. Also, what has a high priority right now or during certain time ranges versus what may be determined by the ML model 325 not to be a priority at later times.

As mentioned, the determination as to whether notifications are important is based on a current context of a user, which an ML model 325 will recognize. Accordingly, the described techniques also involve determining the current context of the user during different times during a day, days of the week, or around holidays with respect to how the user answers notifications from certain applications, etc. For the ML model 325 to capture this context, data describing the above-noted context characteristics (e.g., the current action or history of just performed actions, and/or the location of the user) is captured for the current context. These characteristics captured for the current context can be compared by the ML model 325 to the characteristics captured for previously encountered contexts to determine similar contexts. Notification-related actions taken by the user in previously encountered similar contexts can then be used by the ML model 325 to inform the techniques regarding which notifications the user may consider important in the current context.

In other configurations, the OS 310, electronic device processor 320, notification filter 330, and ML model 325 may not be implemented on the electronic device 300, but, rather, on other devices. Instead of being implemented on an electronic device such as a mobile phone, the OS 310, electronic device processor 320, notification filter 330, and ML model 325, may be implemented in wearable glasses, in virtual reality (VR), or in an augmented reality (AR) environment. AR or VR may be performing a task with glasses, such as driving a vehicle. To reduce or eliminate unwanted notifications, the glasses will not want to display unnecessary or unwanted notifications, messages, or alerts while driving. The filters and ML models, as discussed above, can be used to assist in reducing or eliminating unwanted notifications while wearing VR or AR glasses. Currently, while using Google maps, a user may not want "a friend suggestion" while using Google maps while driving. The OS 310, notification filter 330, and/or ML model 325 can be used to reduce these unwanted notifications while wearing VR or AR glasses.

In another scenario, AR glasses may use eye tracking to see if a user has read an informative notification. This type of information may be used by the ML model 325 to determine how important a message is determined to be to the user. In AR, user eye tracking may be useful. In VR, headset tracking can be used to determine if a message was read. Determining dismissal modes, such as verbal modes indicating "go away", "good bye", "later", and so on, may indicate if the notification was read. Amazon's Alexa has multiple notifications, such as a yellow ring indicating multiple notifications are unread. Alexa lets a user know if the user has a notification, but not from where the notification is received from or what type of notification it may be.

In another instance, when providing a relay through a smart device, the relay device may determine if the notification is important as opposed to the OS 310, discussed above. The notification may contain important information related to the notification without requiring a user to click into an app to get more information. If a user is using a certain app, then notifications may not be displayed. If not using a particular application, regarding un-collapsing notifications, then that may indicate a user is not interested in new notifications. The OS 310 may realize that the only notifications about some applications are to be viewed, and notifications from other applications are to be dismissed.

Figure 4:
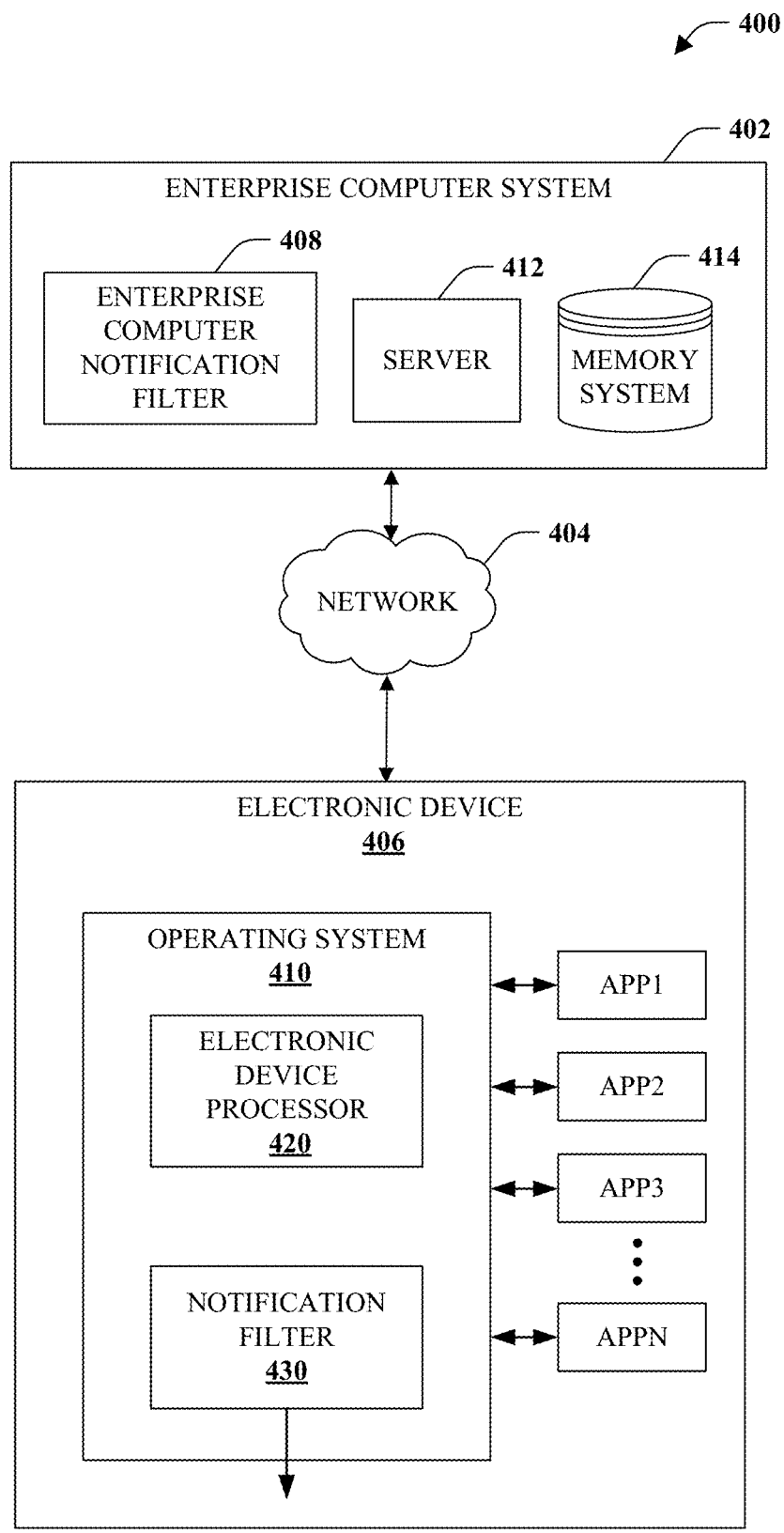
FIG. 4 is a block diagram of another notification filter system.

FIG. 4 illustrates an example computer system 400 with an enterprise computer system 402, a network, 404, and an electronic device 406. The enterprise computer system 402 and the electronic device 406 are both connected to the network 404. The enterprise computer system 402 may be a business computer system managing and/or interacting with remote business computers such as banking computers or remote banking terminals or other related devices. The remote business computer interface with user devices such as the electronic device 406 of FIG. 4. The electronic device 406 may be a device operated by an individual user such as a laptop, a phone, a tablet, and the like.

The enterprise computer system 402 may include an enterprise computer notification filter 408, a server 412, and a memory system 414. The enterprise computer notification filter 408 is adapted to filter notifications that may arrive at the enterprise computer system 402 from a variety of sources and filter the notifications and messages so that only notifications or messages of interest are provided to a user of the enterprise's computer system 402 and/or the electronic device 406. The filtering may be performed above, as discussed above, with reference to the notification filter 220 of FIG. 2.

The server 412 is generally a piece of computer hardware and/or software that provides functionality to other software programs and/or devices such as client devices. The server may be a virtual machine that is performing server services. A hypervisor may be used to direct a physical computer to function at least partially as a virtual server.

The memory system 414 can be any suitable device capable of storing and permitting the retrieval of data. In one aspect, the memory system 414 is capable of storing notifications or messages or related data. The memory system 414 may include storage media that includes volatile and non-volatile, removable and non-removable media implemented in any method or technology for storage of information. Storage media includes, but is not limited to, storage devices such as memory devices (e.g., random access memory (RAM), read-only memory (ROM), magnetic storage devices (e.g., hard disk, floppy disk, cassettes, tape), optical disks and other suitable storage devices. The memory system 414 can be any suitable device capable of storing and permitting the retrieval of data.

The electronic device 406 includes an OS 410 (operating system) and a notification filter 430. The notification filter 430 has the capability of filtering and providing a way to limit the number of notifications and messages to those notifications and messages that the user is interested in. The notification filter may perform this in a variety of ways as discussed below.

The OS 410 may interface with multiple apps 1-N. The OS 410 is an operating system that is common on most electronic devices that coordinates the use of electronic device resources among several applications, peripheral devices, and other devices running on an electronic device. As understood by those of ordinary skill in the art, the OS 410 may be a single task or multitask OS, may be a single user or multiuser OS, may be a distributed OS, may be an embedded OS, a real-time OS, or another suitable OS as understood by those of ordinary skill in the art.

The electronic device processor 420 may be implemented with solid state devices such as transistors and may be a processor that implements functions that one of ordinary skill in the art will appreciate is manufactured in silicon or other types of transistors by processors. Furthermore, the electronic device processor 420 may be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein.

The electronic device 406 with the notification filter 430 provides a way for device users to find meaning in their notifications again. Each app 1-N weights their notifications and gives a higher weight to more important notifications. The OS 410 and/or notification filter 430 then weights the application notification or message based on usage and device user interaction with notifications. For example, if the user of the electronic device 406 is clicking on a first application's notifications and never, or rarely, clicks on a second application's notifications, then notifications or messages from the first application are determined by the OS 410 and/or notification filter 430 to be of greater importance to the user. In that case, only nonfictions or messages from the first application may be presented by the electronic device processor 420 to the user and notifications and messages from the second application will be blocked by the OS 410 and/or the notification filter 430. Only the notifications with high weights from both the application and the OS 410 and/or the notification filter 430 are important enough to be seen by the device user. These notifications and/or messages make it to the home/lock screen and/or trigger a badge application icon or trigger another type of device user alert. Notifications and messages may be filtered/blocked by the notification filter 430 and/or OS 410 in other ways, as discussed above.

In some configurations, the enterprise computer notification filter 408 may filter notifications and messages originating in applications not located in the electronic device 406, but that, instead, originate in or pass through the enterprise computer system 402. In this case, the enterprise computer notification filter 408 may filter notifications and messages that the enterprise computer notification filter 408 has the ability to collect information about. In some cases, the notification filter 430 of the electronic device 406 may share information about applications and devices sending messages to the electronic device 406 to assist the OS 410 and/or the notification filter 430 in the electronic device 406 in determining which notifications and messages should be blocked at the enterprise computer system 402 before those notifications reach the electronic device 406 for possible display to a user of the electronic device 406.

Figure 5:
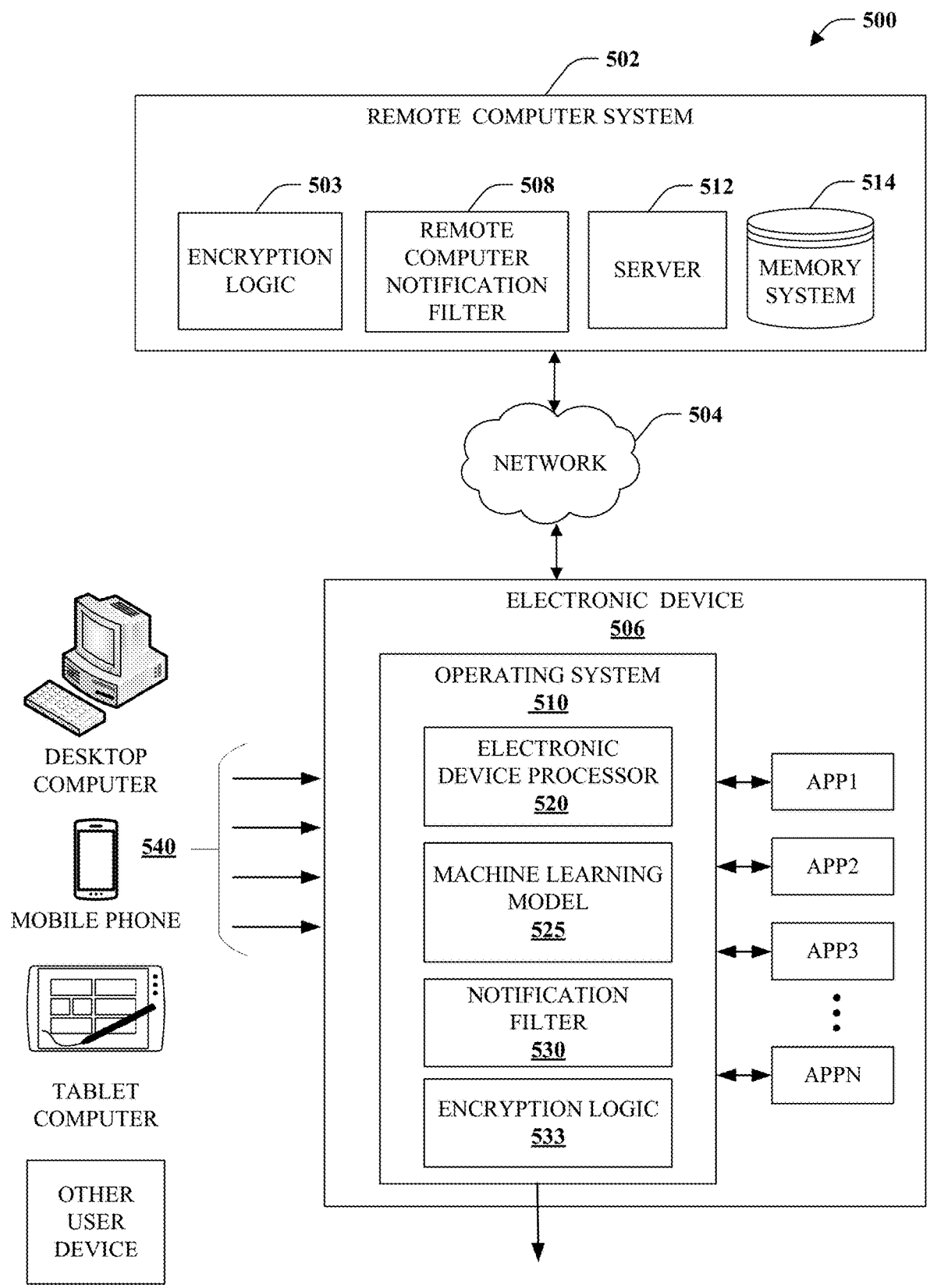
FIG. 5 is a block diagram of another notification filter system.

FIG. 5 illustrates an example computer system 500 with a remote computer system 502, a network, 504, and an electronic device 506. The remote computer system 502, network 504, and the electronic device 506 may function similar to the enterprise computer system 402, network 404, and the electronic device 406 of FIG. 4 that was discussed above, except that the remote computer system 502 and the electronic device 506 are connected to encryption logic 503 and encryption logic 533, respectively, that is discussed below. The remote computer system 502 and the electronic device 506 are both connected to the network 504. The remote computer system 502 may be a business computer system managing and/or interacting with remote business computers such as banking computers or remote banking terminals or other related devices. The electronic device 506 may be a device operated by an individual user, such as a laptop, a mobile phone, a tablet, and the like. Additionally, external devices such as a mobile phone, tablet computer, laptop computer, and the like may provide other notifications 540 to an OS 510 (operating system).

The remote computer system 502 may include a remote computer notification filter 508, a server 512, and a memory system 514. The remote computer notification filter 508 is adapted to filter notifications that may arrive at the remote computer system 502 from a variety of sources and filter the notifications and messages so that generally, just notifications or messages of interest are provided to a user of the remote computer system 502 and/or the electronic device 506. The filtering may be performed above as discussed above with reference to the OS 230 and/or notification filter 220 of FIG. 2 and/or the OS 310 and/or the notification filter 330 of FIG. 3.

The server 512 is generally a piece of computer hardware and/or software that provides functionality to other software programs and/or devices such as client devices.

The electronic device 506 includes the OS 510, a notification filter 530, and an ML model 525 (machine learning model). The notification filter 530 has the capability of filtering and providing a way to limit the number of notifications and messages to those notifications and messages that the user is interested in viewing. The notification filter may accomplish this in a variety of ways as discussed above with reference to FIGS. 2-4.

The electronic device processor 520 may be implemented with solid state devices such as transistors and may be a processor that implements functions that one of ordinary skill in the art will appreciate may be implemented in silicon or other types of physical materials.

The electronic device 506 with the OS 510, the notification filter 530, and/or the ML model 525 may work together in conjunction or may work separately to receive and filter notifications and messages. Notifications and messages are received from apps 1-N. Each app 1-N weights their notifications and gives a higher weight to more important notifications. The OS 510, the notification filter 530, and/or the ML model 525 then weights the application notification or message based on usage and the device user's interactions with the notifications. For example, if the user of the electronic device 506 is clicking on a first application's notifications and never, or rarely, clicks on a second application's notifications, then notifications or messages from the first application are determined by the OS 510 and/or notification filter 530 to be of greater importance to the user. In that case, only nonfictions or messages from the first application may be presented by the electronic device processor 520 to the user and notifications and messages from the second application will be blocked by the OS 510 and/or the notification filter 530. Only the notifications with high weights from both the application and the OS 510, the notification filter 530, and/or the ML model 525 are important enough to be seen by the device user. These notifications and/or messages make it to the home/lock screen and/or trigger a badge application icon or trigger another type of device user alert. Notifications and messages may be filtered/blocked by the OS 510, the notification filter 530, and/or the ML model 525 in other ways, as discussed above.

In some configurations, the remote computer notification filter 508 may filter notifications and messages originating in applications not located in the electronic device 506, but that, instead, originate in or pass through the remote computer system 502. In this case, the remote computer notification filter 508 (and its OS) may filter notifications and messages that the remote computer notification filter 508 has the ability to collect information about. In some cases, the OS 510, the notification filter 530, and/or the ML model 525 of the electronic device 506 may share information about applications and devices sending messages to the remote computer system 502 to assist the remote computer notification filter 508 in determining which notifications and messages should be blocked at the remote computer system 502 before those notifications reach the electronic device 506 for possible display to a user of the electronic device 506.

The determination as to whether notifications are important is based on a current context of a user, which an ML model 525 in the electronic device 506 will recognize. Accordingly, the described techniques also involve determining the current context of the user during different times during a day, days of the week, around holidays with respect to how the user answers notifications from certain applications, etc. For the ML model 525 to capture this context, data describing the above-noted context characteristics (e.g., the current action or history of just performed actions, and the location of the user) is captured for the current context. These characteristics captured for the current context can be compared by the ML model 525 to the characteristics captured for previously encountered contexts to determine similar contexts. Notification-related actions taken by the user in previously encountered similar contexts can then be used by the ML model 525 to inform the techniques regarding which notifications the user may consider important in the current context.

In some instances, encryption logic 503 located in the remote computer system 502 and encryption logic 533 located in the electronic device 506 is operable to produce encrypted plaintext data by way of an encryption algorithm or function. The encryption logics 533 and 503 allow the electronic device 506 and the remote computer system 502 to send secure data back and forth while assuring data is protected while passing through the network 504. An encryption algorithm is subsequently executed on the electronic device 506 and the remote computer system 502 to produce encrypted data representative of the encoded plaintext data. Stated differently, the original plaintext of the combination of encoded plaintext data is encoded into an alternate cipher text form. For example, the Advanced Encryption Standards (AES), Data Encryption Standard (DES), or another suitable encryption standard or algorithm may be used. In one instance, symmetric-key encryption can be employed in which a single key both encrypts and decrypts data. The key can be saved locally or otherwise made accessible by the encryption logics 503 and 533. Of course, an asymmetric-key encryption can also be employed in which different keys are used to encrypt and decrypt data. For example, a public key for a destination downstream function can be utilized to encrypt the data. In this way, the data can be decrypted downstream at a user device, as mentioned earlier, utilizing a corresponding private key of a function to decrypt the data. Alternatively, a downstream function could use its public key to encrypt known data.

An additional level of security to the encoded data by digitally signing the encrypted filtered notification and message data. Digital signatures employ asymmetric cryptography. In many instances, digital signatures provide a layer of validation and security to notifications and messages sent through a non-secure channel. Properly implemented, a digital signature gives the receiver, user device, reason to believe the message was sent by the claimed sender.

Digital signature schemes, in the sense used here, are cryptographically based and need to be implemented properly to be effective. Digital signatures can also provide non-repudiation, meaning that the signer cannot successfully claim they did not sign a message, while also claiming their private key remains secret. In one aspect, some non-repudiation schemes offer a timestamp for the digital signature, so that even if the private key is exposed, the signature is valid.

Digitally signed messages may be anything representable as a bit-string such as encrypted data. The encryption logics 503 and 533 may use signature algorithms such as RSA (Rivest-Shamir-Adleman), which is a public-key cryptosystem that is widely used for secure data transmission. Alternatively, the Digital Signature Algorithm (DSA), a Federal Information Processing Standard for digital signatures, based on the mathematical concept of modular exponentiation and the discrete logarithm problem may be used. Other instances of the signature logic may use other suitable signature algorithms and functions.

The aforementioned systems, architectures, platforms, environments, or the like have been described with respect to interaction between several logics and components. It should be appreciated that such systems and components can include those logics and/or components or sub-components and/or sub-logics specified therein, some of the specified components or logics or sub-components or sub-logics, and/or additional components or logics. Sub-components could also be implemented as components or logics communicatively coupled to other components or logics rather than included within parent components. Further yet, one or more components or logics and/or sub-components or sub-logics may be combined into a single component or logic to provide aggregate functionality. Communication between systems, components or logics and/or sub-components or sub-logics can be accomplished following either a push and/or pull control model. The components or logics may also interact with one or more other components not specifically described herein for the sake of brevity but known by those of skill in the art.

Figure 6:
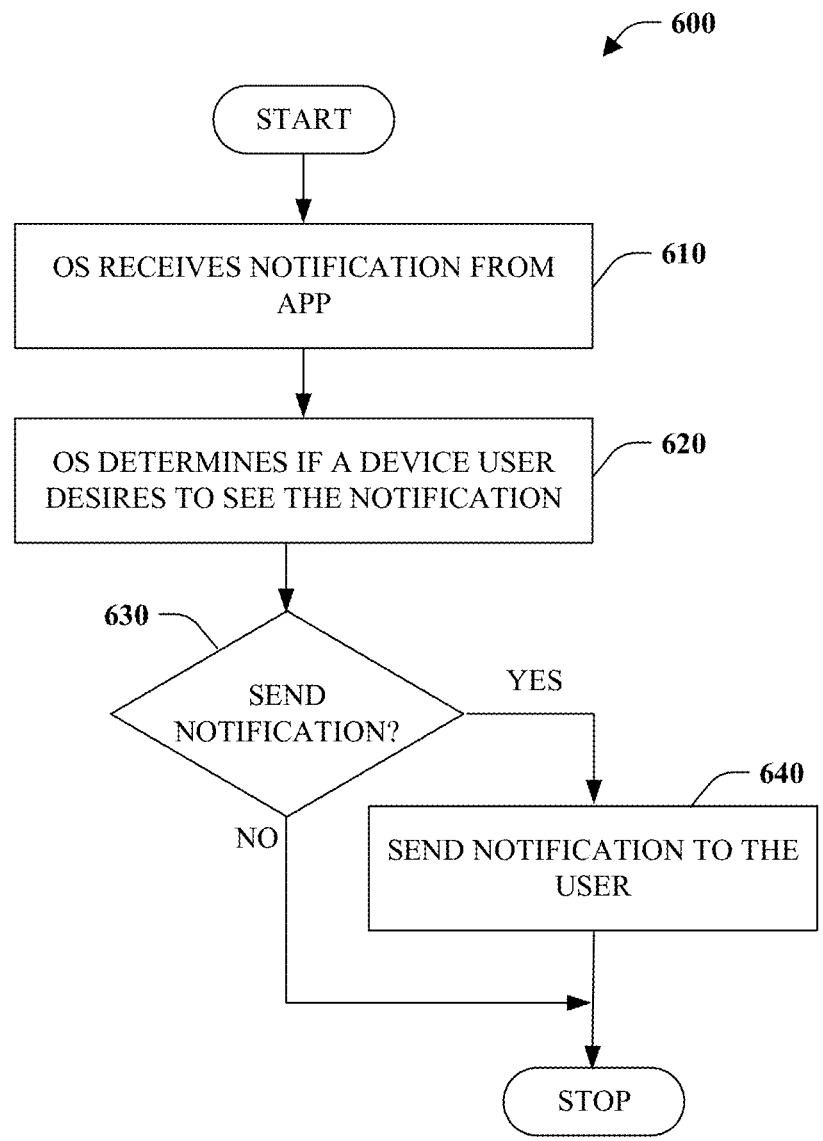
FIG. 6 is a flow chart diagram of a notification filter method.
Figure 7:
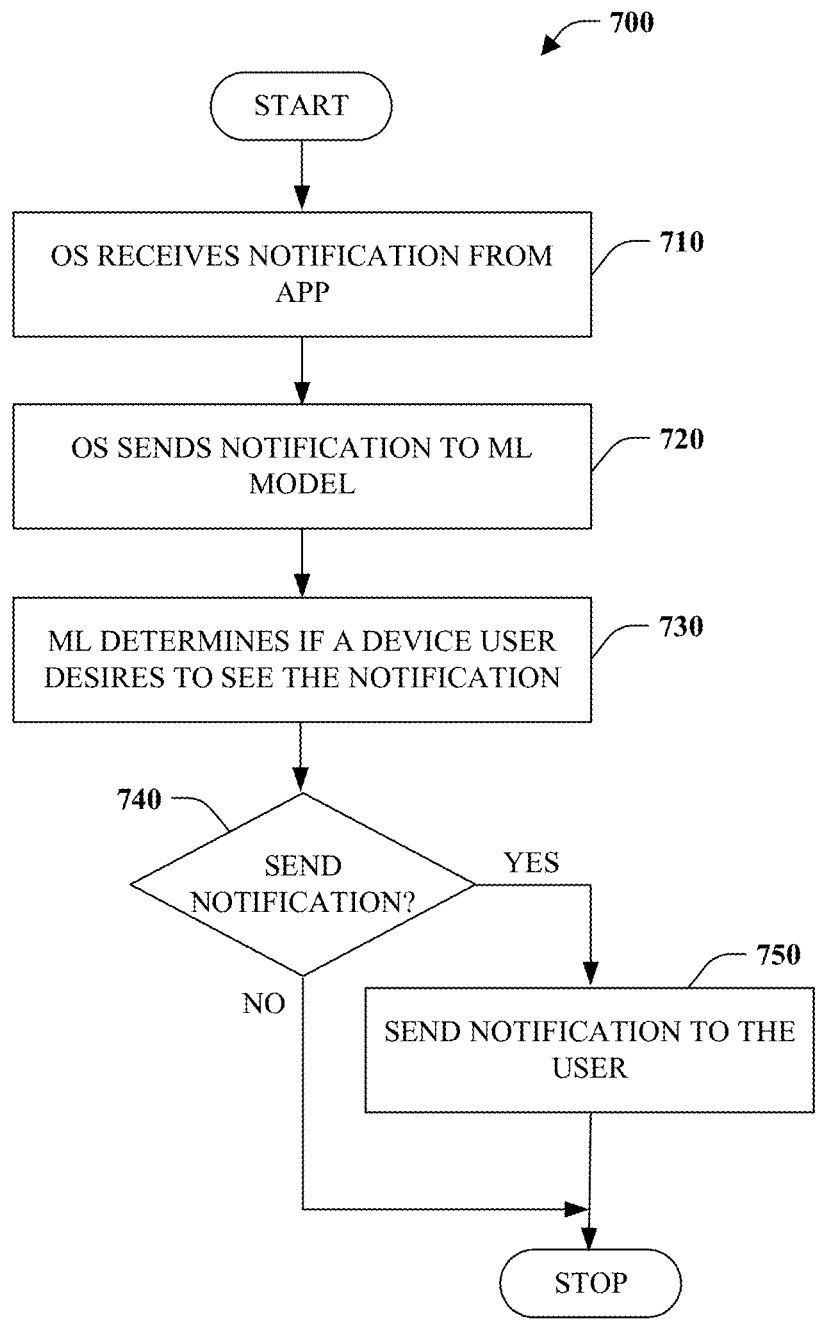
FIG. 7 is a flow chart diagram of another notification filter method.
Figure 8:
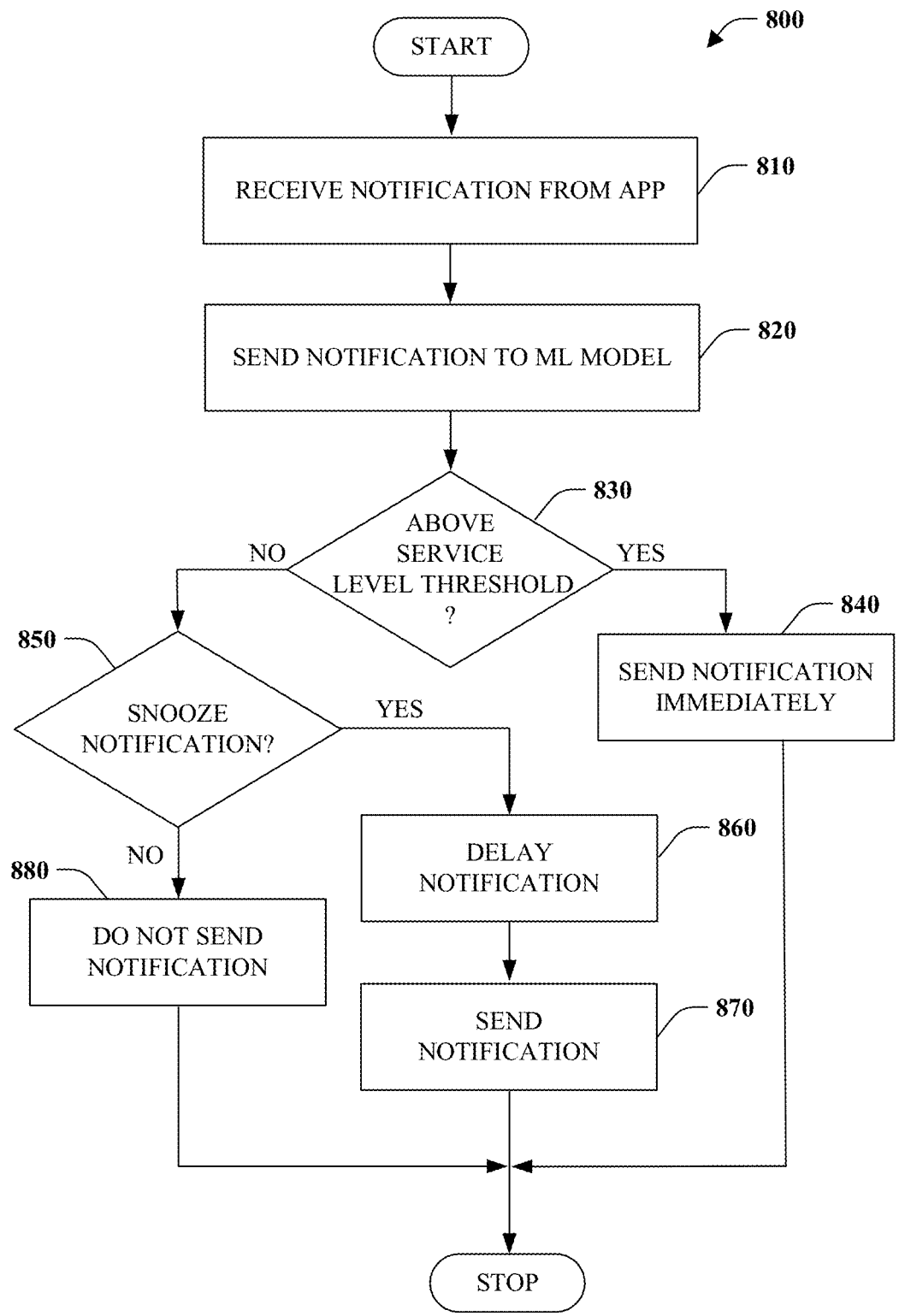
FIG. 8 is a flow chart diagram of another notification filter method.

In view of the example systems described above, methods that may be implemented in accordance with the disclosed subject matter will be better appreciated with reference to flow chart diagrams of FIGS. 6-8. While, for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 6, a method 600 for filtering notifications and messages is depicted in accordance with an aspect of this disclosure. The method 600 for filtering notifications and messages can be performed by the electronic device 200 for filtering notifications, as discussed above with reference to FIG. 2.

At reference numeral 610, an operating system (OS) receives from an application (app) a request to send a notification to a user of an electronic device. The notification was generated by the app. In some instances, the notification can be one of several notifications and messages generated by several apps in operation with the OS. The OS may be running on a user device such as a mobile phone, a laptop computer, a tablet computer, or another electronic device.

The OS determines by filtering, at reference numeral 620, to determine, at reference numeral 630, if the user is interested in receiving the notification. As discussed above, the OS may filter the notification(s) using specialized filtering logic or silicon logic on a chip.

The OS will send, at reference numeral 640, the notification to the user if the user is interested in receiving the notification. If the user is not interested in receiving the notification, the notification is not sent. In other instances, the notification may be a badge notification, a push notification, or another type of notification or message. In other configurations, the notification can be sent as a visual notification, a haptic notification, and/or a vibratory notification.

FIG. 7 depicts a method 700 for filtering notifications and messages using a machine learning (ML) model. The method 700 can be implemented and performed by the electronic device 300 for filtering notifications with an ML model 325 as illustrated in FIG. 3.

The method 700 executes, on an electronic device processor, instructions that cause the electronic device processor to perform operations for displaying notifications and messages of interest to a user. The operations include receiving, at numeral 710, at an OS from a plurality apps requests to send a notifications and messages to a user of an electronic device. The notifications and messages are generated by the apps.

The OS sends the notification to an ML model, at numeral 720. The notifications and messages are filtered, at numeral 730, by the ML model to determine, at reference numeral

740, if the user is interested in receiving any of the notifications and messages. In some embodiments, the ML model is used in conjunction with the OS to filter the notifications. The ML model can use a past history of the user by when determining if the user desires to receive the notifications and messages. If a user desires to see any notification(s) then just those notification(s) and message(s) are sent, at reference numeral 750, to the user.

FIG. 8 depicts a method 800 for filtering notifications and messages. The method 800 can be implemented and performed by the electronic device 300 that filters notifications and messages. The method 800 may be running on an electronic device 300 such as a handheld phone, laptop computer, tablet computer, and the like operated by a user of the device.

At numeral 810, the method 800 receives, at an OS of the electronic device, notification(s) from one or more apps. These notification(s) are sent to an ML model, at reference numeral 820. The ML model has the ability to filter the notification(s) based on a past history of the user's interactions with the electronic device and apps running on the electronic device.

The ML model filters the notification(s) and determines, at reference numeral 830, if a confidence level is above a service threshold level, calculated interest value, and the like. In some instances, the ML model and the OS will filter the notification(s) together. If the confidence is above a threshold level, the notification(s) is immediately sent, at reference numeral 840, to the user.

When the notification is not a service notification, a determination is made, at reference numeral 850, if the notification(s) is a regular notification or a snooze notification that may be sent at a later time when the user is more interested in receiving the notification(s). When the notification(s) is a regular notification that the user may be more interested in receiving at a delayed later time, an appropriate delay is generated, at reference numeral 860, and the notification(s) is sent, at reference numeral 870, after that time.

In some instances, when the user may be interested in receiving the notification(s) later, the notification(s) is periodically sent as a sequence of regular notifications within a time window after the delayed later time. In other instances, it may be determining by the ML model that the user may be interested at receiving the notification(s) at a later time based on a calendar, a work schedule, holidays, or a time of day.

If it is determined that the user will not have interest in receiving the notification(s) at a later time, the notification(s) are not sent, at reference numeral 880, or are simply dropped. For example, if the notification is for a coupon, the notification is not sent after the coupon has expired.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
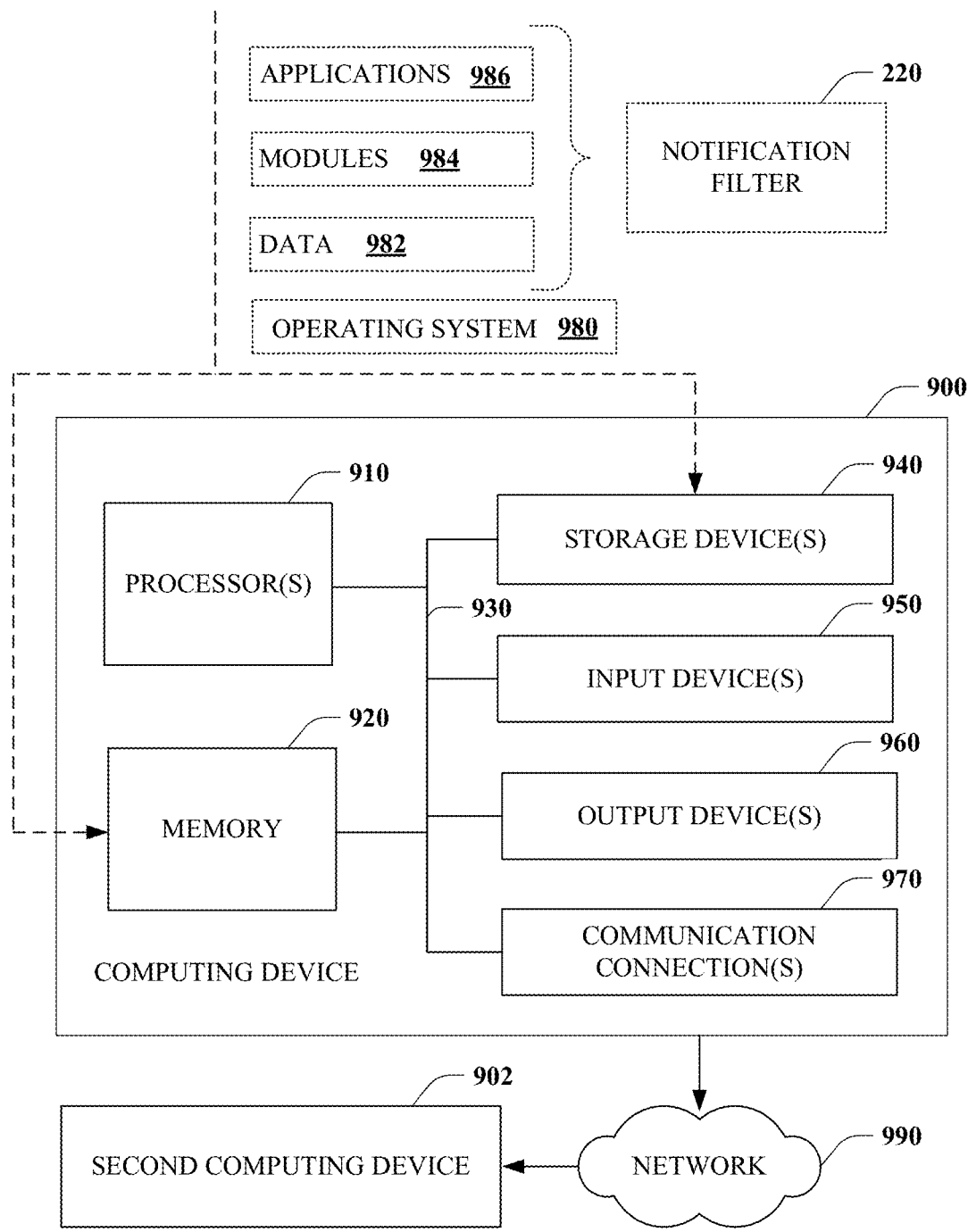
FIG. 9 is a block diagram illustrating a suitable operating environment for aspects of the subject disclosure.

To provide a context for the disclosed subject matter, FIG. 9, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 9, illustrated is an example computing device 900 (e.g., desktop, laptop, tablet, watch, server, hand-held, programmable consumer or industrial electronics, set-top box, game system, compute node). The computing device 900 includes one or more processor(s) 910, memory 920, system bus 930, storage device(s) 940, input device(s) 950, output device(s) 960, and communications connection(s) 970. The system bus 930 communicatively couples at least the above system constituents. However, the computing device 900, in its simplest form, can include one or more processors 910 coupled to memory 920, wherein the one or more processors 910 execute various computer-executable actions, instructions, and or components stored in the memory 920.

The processor(s) 910 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 910 may also be implemented as a combination of computing devices, for example, a combination of a DSP and a microprocessor, a plurality of microprocessors, multi-core processors, one or more microprocessors in conjunction with a DSP core, or any other such configuration. In one configuration, the processor(s) 910 can be a graphics processor unit (GPU) that performs calculations concerning digital image processing and computer graphics.

The computing device 900 can include or otherwise interact with a variety of computer-readable media to facilitate control of the computing device to implement one or more aspects of the disclosed subject matter. The computer-readable media can be any available media accessible to the computing device 900 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 900. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 900, such as during start-up, can be stored in non-volatile memory, while volatile memory can act as external cache memory to facilitate processing by the processor(s) 910, among other things.

The storage device(s) 940 include removable/non-removable, volatile/non-volatile storage media for storage of vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 acts to control and allocate resources of the computing device 900. Applications 986 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer 900 into a specialized machine in accordance with the logic provided thereby.

All or portions of the disclosed subject matter can be implemented using standard programming and/or engineering techniques to produce software, firmware, hardware, or any combination thereof to control the computing device 900 to realize the disclosed functionality. By way of example and not limitation, all or portions of the notification filter 220, 330, 430, and 530 can be, or form part of, the application 986, and include one or more modules 984 and data 982 stored in memory and/or storage device(s) 940 whose functionality can be realized when executed by one or more processor(s) 910.

In accordance with one particular configuration, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the notification filter 220, 330, 430, and 530 and/or functionality associated therewith can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth), or a combination thereof.

The computing device 900 can also include communication connection(s) 970 to enable communication with at least a second computing device 902 utilizing a network 990. The communication connection(s) 970 can include wired or wireless communication mechanisms to support network communication. The network 990 can correspond to a local area network (LAN) or a wide area network (WAN) such as the Internet. The second computing device 902 can be another processor-based device with which the computing device 900 can interact. In one instance, the computing device 900 can execute a notification filter 220 for a first function, and the second computing device 902 can execute a notification filter 220 for a second function in a distributed processing environment. Further, the second computing device can provide a network-accessible service that stores source code, and encryption keys, among other things that can be employed by the notification filter 220 executing on the computing device 900.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
one or more processors programmed with instructions that, when executed by the one or more processors, cause operations comprising:
obtaining, from an application, a request to present a notification to a user, the notification comprising notification data indicating an expiration time;
in connection with the request from the application, generating, based on the notification data and an active context of the user, a relevancy score for the notification via a machine learning model that is trained on historical behavior of the user with respect to previous application notifications and prior active context of the user;
determining that the relevancy score for the notification does not satisfy a relevancy threshold for presentation to the user at a current time; and
performing filtering the notification by:
snoozing the notification for a delay time period in response to the determination that the relevancy score does not satisfy the relevancy threshold and a determination that the expiration time indicated by the notification data occurs after the delay time period; and
dropping the notification in lieu of snoozing the notification, such that the notification is not scheduled to be presented to the user on a notification interface, in response to the determination that the relevancy score does not satisfy the relevancy threshold and a determination that the expiration time indicated by the notification data occurs before an end of the delay time period, despite the expiration time occurring indicated by the notification data after the current time.

2. The system of claim 1, the operations further comprising:
obtaining, based on the notification data and the active context of the user, via one or more machine learning models, a prediction of a future time for presenting the notification; and
determining, based on the prediction of the future time, the delay time period for the snoozing or the dropping of the notification.

3. The system of claim 1, the operations further comprising:
determining the active context of the user based on calendar or location data associated with the user.

4. The system of claim 1, wherein a user device of the user generates the relevancy score via the machine learning model and drops the notification in lieu of snoozing the notification, such that the notification is not scheduled to be presented on the notification interface to the user, in response to the determination that the relevancy score does not satisfy the relevancy threshold and the determination that the expiration time indicated by the notification data occurs before the end of the delay time period.

5. The system of claim 1, wherein dropping the notification comprises dropping the notification in lieu of snoozing the notification, such that the notification is not scheduled to be presented on the notification interface to the user, in response to (i) the determination that the relevancy score does not satisfy the relevancy threshold, (ii) the determination that the expiration time occurs before the end of the delay time period, and (iii) a determination that the notification is not a service level notification.

6. The system of claim 1, the operations further comprising:
obtaining, from the application, an importance score assigned by the application to the notification,
wherein generating the relevancy score comprises providing, to the machine learning model, a representation of the notification data, a representation of the active context, and a representation of the importance score, the machine learning model outputting the relevancy score based on the notification data, the active context, and the importance score assigned by the application.

7. A method comprising:
executing, by one or more processors, instructions that cause operations comprising:
obtaining, from an application, a request to present a notification to a user, the notification comprising notification data indicating an expiration time;
in connection with the request from the application, generating, based on the notification data and an active context of the user, a relevancy score for the notification via a machine learning model that is trained on historical behavior of the user with respect to previous application notifications and prior active context of the user;
determining that the relevancy score for the notification does not satisfy a relevancy threshold for presentation to the user at a current time and that the expiration time indicated by the notification data occurs before an end of a delay time period; and
dropping the notification, such that the notification is not scheduled to be presented to the user on a notification interface, in response to the determination that the relevancy score does not satisfy the relevancy threshold and the determination that the expiration time indicated by the notification data occurs before the end of the delay time period,
wherein, in connection with another request to present at least one other notification to the user, (i) a given relevancy score for the at least one other notification is determined to not satisfy the relevancy threshold, (ii) a given expiration time for the at least one other notification is determined to occur after a given delay time period, and (iii) the at least one other notification is snoozed for the given delay time period in response to the determination that the given relevancy score does not satisfy the relevancy threshold and the determination that the given expiration time occurs after the given delay time period.

8. The method of claim 7, further comprising:
obtaining, based on the notification data and the active context of the user, via one or more machine learning models, a prediction of a future time for presenting the notification; and
determining, based on the prediction of the future time, the delay time period for assessing whether to drop the notification.

9. The method of claim 7, further comprising:
determining the active context of the user based on calendar or location data associated with the user.

10. The method of claim 7, wherein a user device of the user generates the relevance score via the machine learning model and drops the notification, such that the notification is not scheduled to be presented on the notification interface to the user, in response to the determination that the relevancy score does not satisfy the relevancy threshold and the determination that the expiration time indicated by the notification data occurs before the end of the delay time period.

11. The method of claim 7, wherein dropping the notification comprises dropping the notification, such that the notification is not scheduled to be presented on the notification interface to the user, in response to (i) the determination that the relevancy score does not satisfy the relevancy threshold, (ii) the determination that the expiration time occurs before the end of the delay time period, and (iii) a determination that the notification is not a service level notification.

12. The method of claim 7, further comprising:
obtaining, from the application, an importance score assigned by the application to the notification,
wherein generating the relevancy score comprises providing, to the machine learning model, representations of the notification data, the active context, and the importance score, the machine learning model outputting the relevancy score based on the notification data, the active context, and the importance score assigned by the application.

13. The method of claim 7, wherein the machine learning model comprises a neural network.

14. One or more non-transitory computer-readable media storing instructions that, when executed by one or more processors, cause operations comprising:
obtaining, from an application, a request to present a message to a user, the message comprising message data indicating an expiration time;
in connection with the request from the application, generating, based on the message data and an active context of the user, a relevancy score for the message via a machine learning model that is trained on historical behavior of the user with respect to previous application messages and prior active context of the user;
determining that the relevancy score for the message does not satisfy a relevancy threshold for presentation to the user at a current time;
snoozing the message for a delay time period in response to the determination that the relevancy score does not satisfy the relevancy threshold and a determination that the expiration time indicated by the message data occurs after the delay time period; and
dropping the message, such that the message is not scheduled to be presented to the user on a message interface, in response to the determination that the relevancy score does not satisfy the relevancy threshold and a determination that the expiration time indicated by the message data occurs before an end of the delay time period.

15. The media of claim 14, the operations further comprising:
obtaining, based on the message data and the active context of the user, via one or more machine learning models, a prediction of a future time for presenting the message; and
determining, based on the prediction of the future time, the delay time period for assessing whether to drop the message.

16. The media of claim 14, the operations further comprising:
determining the active context of the user based on calendar or location data associated with the user.

17. The media of claim 14, wherein a user device of the user generates the relevancy score via the machine learning model and drops the message, such that the message is not scheduled to be presented on the message interface to the user, in response to the determination that the relevancy score does not satisfy the relevancy threshold and the determination that the expiration time indicated by the message data occurs before the end of the delay time period.

18. The media of claim 14, wherein dropping the message comprises dropping the message, such that the message is not scheduled to be presented on the message interface to the user, in response to (i) the determination that the relevancy score does not satisfy the relevancy threshold, (ii) the determination that the expiration time occurs before the end of the delay time period, and (iii) a determination that the message is not a service level message.

19. The media of claim 14, the operations further comprising:
obtaining, from the application, an importance score assigned by the application to the message,
wherein generating the relevancy score comprises providing, to the machine learning model, representations of the message data, the active context, and the importance score to obtain the relevancy score from the machine learning model.

20. The media of claim 14, wherein the machine learning model comprises a neural network.

* * * * *